Figure 1:
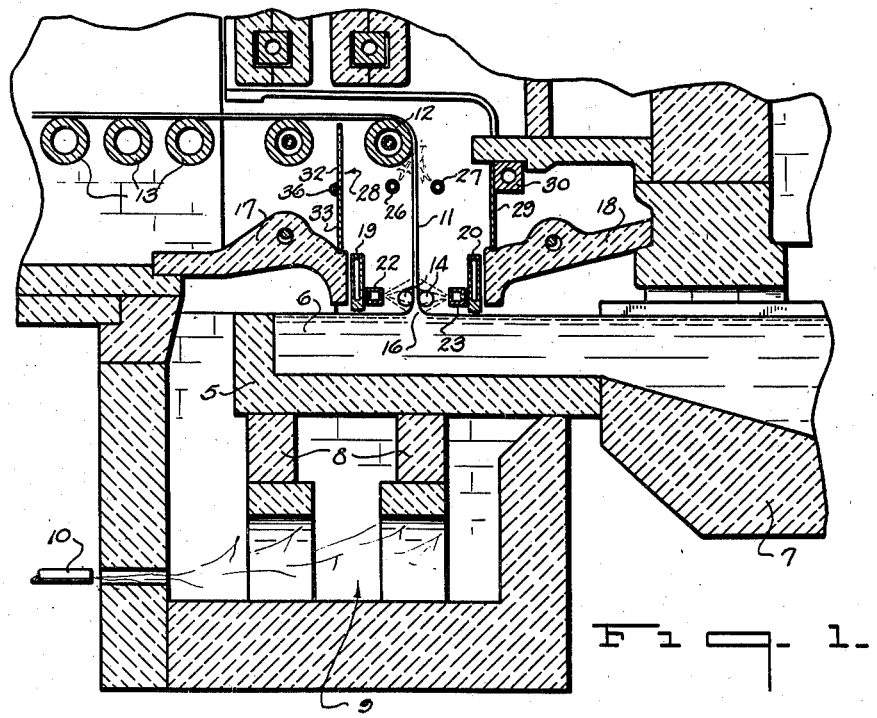

Aug. 9, 1938.  W. T. HAIGHT  2,125,914

APPARATUS FOR PRODUCING SHEET GLASS

Filed July 28, 1934

Inventor
WILLIAM T. HAIGHT.
Frank Fraser
Attorney

Patented Aug. 9, 1938

2,125,914

UNITED STATES PATENT OFFICE 2,125,914

APPARATUS FOR PRODUCING SHEET GLASS

William T. Haight, Charleston, W. Va., assignor to Libbey-Owens-Ford Glass Company, Toledo, Ohio, a corporation of Ohio Application July 28, 1934, Serial No. 737,333

2 Claims. (Cl. 49—17)

The present invention relates to an improved apparatus for producing continuous sheet glass.

This invention is of utility when incorporated in the type of sheet glass drawing machine set forth in the patent to I. W. Colburn, No. 1,248,809, issued December 4, 1917, although it is of course not restricted to such use since it might find application in other processes of forming sheet glass. In the Colburn machine, however, the glass sheet is drawn upwardly from the surface of a bath of molten glass contained in a relatively shallow draw-pot and while still in a semi-plastic condition, although substantially set in its final sheet form, the said sheet is deflected about a cooled rotatable bending roll into the horizontal plane and carried forwardly into and through an annealing leer. In order to maintain the sheet to width, a pair of rotatable knurled rollers is positioned to engage opposite sides of the sheet at each edge thereof, said rollers being arranged at the base of the sheet. Positioned at opposite sides of the sheet closely adjacent the surface of the bath of molten glass to protect the said sheet from heated air currents present around the machine are so-called sheet coolers, each being in the form of a substantially rectangular casing having a cooling medium such as water continuously circulated therethrough.

When producing sheet glass by the process above described, there is a tendency for streaks to be sometimes formed in the sheet being drawn, and in my opinion these streaks come from two principal causes; first, from ununiform cooling of the molten glass by the water-cooled sheet coolers and, secondly, from the stretching of the sheet between the draw-pot and bending roll, which stretch causes a slight narrowing up of said sheet. This shrinkage of the sheet from the sides towards the center thereof causes the formation of small wrinkles and streaks therein.

The principal aim and object of this invention, therefore, is to provide an apparatus for handling and treating the glass sheet being formed whereby the above objectionabe features are eliminated, thereby resulting in the formation of a sheet of superior quality, relatively free from streaks, and of a more uniform thickness and flatness.

Another important object of the invention is to provide such an apparatus wherein the sheet coolers used are of a novel construction to effect a uniform cooling of the molten glass passing therebeneath and also wherein improved means is provided for preventing narrowing of the sheet between the draw-pot and bending roll.

Other objects and advantages of the invention will become more apparent during the course of the following description when taken in connection with the accompanying drawing.

Figure 2:
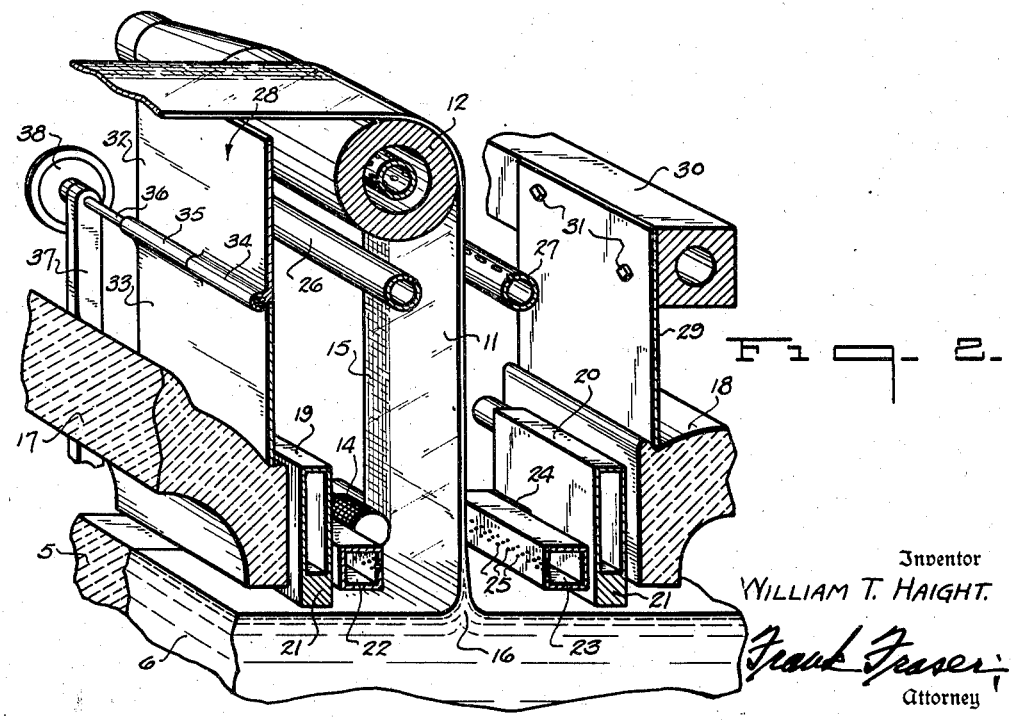

In the drawing wherein like numerals are employed to designate like parts throughout the same, Fig. 1 is a vertical longitudinal section through sheet glass forming apparatus constructed in accordance with the present invention, and Fig. 2 is a perspective sectional view of a portion thereof.

Upon reference now to the drawing, 5 designates a relatively shallow working receptacle or draw-pot formed from a refractory material and containing a bath or mass of molten glass 6 which may be supplied thereto from any suitable form of tank 7. The draw-pot 5 is supported upon stools 8 above a heating chamber 9 heated by burners 10.

The sheet of glass 11 is drawn upwardly from the surface of the mass of molten glass 6 and while still in a semi-plastic condition, although substantially set in final sheet form, is deflected over a rotatable bending roll 12 into the horizontal plane and carried forwardly upon a series of horizontally aligned rolls 13 into and through an annealing leer, not shown.

In order to maintain the sheet 11 to width, a pair of knurled rollers 14 are positioned to engage opposite sides of the sheet at each edge thereof and are driven at a speed to enable a relatively heavy knurled edge 15 to be formed on the sheet which assists in holding the same to width. These rollers are positioned relatively closely adjacent the mass of molten glass 6 and are so arranged that they bite into the base or meniscus 16 of the glass sheet.

Mounted above the draw-pot 5 at opposite sides of the sheet are cover or lip-tiles 17 and 18 which act to direct any heat currents present downwardly toward the surface of the mass of molten glass 6.

Positioned at opposite sides of the sheet 11 are the improved coolers 19 and 20 respectively, having the bottom surfaces thereof disposed closely adjacent the surface of the mass of molten glass. These coolers serve not only to absorb a certain amount of heat from the surface glass passing therebeneath but also act as shields to protect the sheet being drawn from heated air currents escaping from the tank 7 and pot chamber 9. Each of the coolers 19 and 20 is in the form of a substantially rectangular casing extending the entire width of the glass sheet and through which air under pressure is adapted to be circulated.

The type of sheet cooler ordinarily used in the past has been formed of relatively thin sheet metal and has been cooled by the circulation of water therethrough. However, when the cooler is made of relatively thin sheet metal, the bottom thereof is frequently not of a uniform thickness throughout its entire area but, on the contrary, is formed with relatively thin and thicker portions or spots, as a result of which the cooler effects an ununiform cooling of the surface glass passing therebeneath, causing the formation of streaks in the glass sheet.

According to the present invention, the conventional water-cooled sheet coolers are eliminated and in their place are provided the high pressure air-cooled sheet coolers 19 and 20. These coolers differ from the ordinary sheet coolers principally in that the bottoms 21 thereof are materially thicker and in fact made sufficiently thick so that they can be machined and polished to exactly the same thickness throughout their entire length. In consequence, the coolers will have a uniform cooling action upon the molten glass passing therebeneath so as to eliminate the formation of streaks in the sheet heretofore caused by the ununiform cooling action of the conventional sheet cooler. The coolers 19 or 20 also function as air cooled baffles to hold the heat from the pot chamber and tank away from the sheet. These coolers also will not have as severe or sharp a cooling action upon the molten glass as the conventional coolers referred to above.

As brought out above, the formation of streaks in the glass sheet is also occasioned by a slight narrowing of the said sheet between the drawpot and bending roll and that it is the further aim of this invention to prevent this narrowing or shrinkage. To this end, there are provided at opposite sides of the base or meniscus 16 of the glass sheet 11 a pair of cooling members 22 and 23, said coolers being arranged inwardly of and preferably, though not necessarily, welded to or otherwise suitably carried by the sheet coolers 19 and 20 respectively as indicated at 24. Each cooling member 22 and 23 comprises a horizontal elongated metallic casing extending transversely of and parallel with the sheet, said casing being preferably substantially square in cross section and having a large number of relatively small openings 25 formed in the inner wall thereof and through which streams or jets of compressed air or other gaseous fluid are adapted to be directed against the base or meniscus 16 of the glass sheet as indicated by the broken lines in Fig. 1.

The playing of these jets of air upon the sheet just as it leaves the knurled rollers 14 will cause the setting or stiffening of the said sheet so that it will maintain its width at the rollers up to the bending roll. A great number of small holes are formed in each cooling member along its entire length to blow a uniform sheet of air on the meniscus. By preventing contraction or narrowing of the sheet between the draw-pot and bending roll, the tendency toward the formation of wrinkles or streaks in the sheet incident to such shrinkage will be obviated.

The cooling members 22 and 23 are adapted to be so constructed and arranged that they apply the same or substantially the same amount of air to both sides of the sheet, thereby causing uniform cooling of opposite surfaces of the sheet resulting in the same speed of contraction at opposite sides thereof and eliminating any tendency of the air to cause a battered effect on the glass.

For the purpose of removing any dirt which may be blown upon the glass sheet by the cooling members 22 and 23, especially when the said members are first installed, there are provided the two burners 26 and 27 extending transversely at opposite sides of the sheet and preferably positioned at a point just beneath the bending roll 12. These burners are adapted to play a soft flame upon the sheet just before it reaches the bending roll and these flames playing upon the sheet are adapted to soften the glass sufficiently so that all of the dirt will be picked off thereof by the said flames. The flame from the burner 26 playing on the junction of the sheet and bending roll will also serve to keep the roll clean. The burner 27 at the opposite side of the sheet will also tend to soften the sheet at this point to assist in the deflecting thereof over the bending roll.

This invention further contemplates the provision of metal shields positioned at opposite sides of the glass sheet 11 and resting upon the lip-tiles 17 and 18 to prevent the entrance of air and drafts into the drawing chamber so that the only air present therein will be the air from the cooling members 22 and 23. These shields are designated 28 and 29 respectively, the latter shield resting upon the top of lip-tile 18 and secured to the water-cooled machine mantle 30 by suitable fastening elements 31. The shield 28 resting upon lip-tile 17 is formed of upper and lower sections 32 and 33 having overlapping hinge portions 34 and 35 respectively at their adjacent ends through which is received a horizontal rod 36. This rod passes loosely through the hinge portions 35 of the lower section 33 of the shield while the hinge portions 34 of upper section 32 thereof are keyed to the rod so that upon turning of the said rod, the upper section will be moved therewith, the lower section remaining stationary. The rod 36 is mounted at each end in a fixed support 37 and provided at one end of the said rod outwardly of the adjacent support is a hand wheel 38. Upon rotation of this hand wheel, the upper section 32 of the shield can be swung rearwardly away from the bending roll 11 to permit the installation of the said roll as well as its removal from the machine.

The shields 28 and 29 therefore serve to protect the sheet from outside air and drafts and will further assist in keeping dirt out of the machine since the draft caused by the cooling members 22 and 23 will be out of the machine rather than in.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for producing sheet glass, a receptacle containing a mass of molten glass, means for drawing a sheet upwardly from the surface of said mass, and a cooler arranged at one side of the sheet, said cooler comprising a horizontal, substantially rectangular metal casing having its bottom surface positioned closely adjacent the mass of molten glass and through which a cooling medium is adapted to be circulated, the bottom of said cooler being substantially thicker than the side walls thereof and being machined, and polished to the same thickness throughout its entire length.

2. In apparatus for producing sheet glass, a receptacle containing a mass of molten glass, means for drawing a sheet upwardly from the surface of said mass, and a pair of coolers arranged at opposite sides of the sheet, each cooler comprising a horizontal, substantially rectangular metal casing having its bottom surface positioned closely adjacent the mass of molten glass and through which a cooling medium is adapted to be circulated, the bottom of said cooler being substantially thicker than the side walls thereof.

WILLIAM T. HAIGHT.